United States Patent [19]

Hustig

[11] 4,264,973
[45] Apr. 28, 1981

[54] CIRCUITRY FOR TRANSMITTING CLOCK INFORMATION WITH PULSE SIGNALS AND FOR RECOVERING SUCH CLOCK INFORMATION

[75] Inventor: Charles H. Hustig, Hudson, Wis.

[73] Assignee: Minnesota Mining and Manufacturing Company, St. Paul, Minn.

[21] Appl. No.: 968,843

[22] Filed: Dec. 13, 1978

[51] Int. Cl.³ .................. H04L 25/49; H04L 7/06
[52] U.S. Cl. .................................. 375/20; 375/113
[58] Field of Search ..................... 375/17, 20, 25, 37, 375/55, 87, 106, 111, 113; 371/56, 61, 42, 46; 370/100; 328/63, 155; 307/216, 411; 340/347 DD

[56] References Cited

U.S. PATENT DOCUMENTS

| | | | |
|---|---|---|---|
| 2,912,684 | 11/1959 | Steele | 375/17 |
| 3,846,583 | 11/1974 | Boulter | 375/55 |
| 3,863,025 | 1/1975 | Gonsewski et al. | 375/55 |

Primary Examiner—Benedict V. Safourek
Attorney, Agent, or Firm—Cruzan Alexander; Donald M. Sell; Robert L. Marben

[57] ABSTRACT

Circuitry is disclosed for transmitting clock signal information with a transmitted signal. The transmitted signal is obtained by applying non-return to zero input pulse signals, provided at one-half the frequency of the clock signal, with alternate "1" logic and "0" logic signals, which are coincident with the transitions in the pulse signals, to an exclusive-or logic circuit and combining the output of the exclusive-or logic circuit with the alternate "1" and "0" logic signals at an adder circuit. The adder circuit provides an output that is a succession of signals at one-half the frequency of the clock signal with each of the successive signals having an amplitude different than the amplitude of the preceding signal. The logic signals provided to the adder circuit have an amplitude equal to or greater than the output of the exclusive-or logic circuit. Circuitry is also disclosed for recovering the clock information from the signal provided from the adder and for reconstructing the input pulse signals.

14 Claims, 3 Drawing Figures

4,264,973

CIRCUITRY FOR TRANSMITTING CLOCK INFORMATION WITH PULSE SIGNALS AND FOR RECOVERING SUCH CLOCK INFORMATION

BACKGROUND OF THE INVENTION

1. Field of the Invention

This invention relates to the transmission of clock signal information as a part of the transmission signal from a transmission facility to a receiving facility and to the recovery of the clock signal at the receiving facility for use in processing the received signal and in particular to the transmission of the clock signal information and pulse signal information by amplitude modification of input pulse signals in accordance with clock signal information wherein the input pulse signals are of the non-return to zero type.

2. Prior Art

The use of pulse signals of the non-return to zero type for the transmission of information is well known. A non-return to zero pulse signal is one that has transitions which are coincident with clock signals. The various transmission systems using pulse signals require the clock signal used for various timing functions at the transmission facility to be present at a receiving facility to provide the proper time base needed for processing the received pulse signals. Various arrangements have been used to transmit clock signal information which is processed at the receiving facility to recover or regenerate the desired clock signal. Such prior arrangements include phase encoding techniques which require excessive bandwidth and frequency division modulation (FDM) arrangements which require a great deal of extra generation and demodulation circuitry. In addition, the problem of recovering clock information is magnified when high pulse rates are involved since phase distortion increases and the amount of shift in pulse transitions is significant with respect to the clock period.

SUMMARY OF THE INVENTION

The present invention is embodied in circuitry which avoids the disadvantages of prior art arrangements for transmitting clock signal information with the transmitted signal for recovery at a receiving facility. Circuitry embodying the invention receives a clock signal and input pulse signals produced in timed relationship with the clock signal and at a frequency that is one-half the frequency of the clock signal. The pulse signals and the clock signal are combined to modify the amplitude of the pulse signals for producing a signal for transmission that contains the pulse signal information and clock signal information. The circuitry includes circuit means adapted to receive the clock signal for providing a series of alternate "1" logic and "0" logic signals which are coincident with transitions in the pulse signals and, therefore, are present at a frequency equal to one-half of the frequency of the clock signal. An exclusive-or logic means is included which is adapted for receiving the input pulse signals and the series of logic signals at separate inputs. An adder circuit is also included which is adapted to receive the series of logic signals and the output of the exclusive-or logic means. The series of logic signals is provided to the adder at an amplitude equal to or greater than the output of the exclusive-or logic means. The output of the adder is a succession of signals at one-half the frequency of the clock signal with each signal having an amplitude that is different than the amplitude of the preceding signal. The possible amplitudes of the output signals include amplitudes of R, D, K and K+D, where R is an amplitude less than D, D is the amplitude of the output of the exclusive-or logic at the adder circuit and K is the amplitude of the series of logic signals at the adder circuit and is equal to or greater than D.

This invention also provides circuitry useable at a receiving facility for recovering clock information from the foregoing output signals from which the clock signal is obtained for use in reconstructing the input pulse signals and processing the recovered pulse signals. Circuitry for processing such amplitude modified pulse signals at a receiving facility includes a bandpass filter adapted for receiving the amplitude modified pulse signals; a limiter circuit for receiving the output of the bandpass filter for limiting the amplitude of the output of said bandpass filter and a frequency doubler for receiving the output of the limiting circuit to provide an output signal having a frequency equal to the clock signal. Such circuitry also includes a first comparator adapted for receiving the amplitude modified pulse signals for providing an output when the modified pulse signals present an amplitude in excess of K; a second comparator adapted for receiving the modified pulse signals for providing an output when the modified pulse signals present an amplitude less than D. A circuit portion is also included that is adapted for receiving the output of the first and second comparators and the output signal of the frequency doubler for providing an output in timed relationship with the output of said frequency doubler that is a reconstruction of the input pulses. The last mentioned circuit portion can be provided by two series connected flip-flop circuits, the first of which can be a synchronous latch type flip-flop which is reset by the output of the frequency doubler. The second flip-flop can be provided by a delay type flip-flop which is clocked by the output of the frequency doubler.

BRIEF DESCRIPTION OF THE DRAWING

For a fuller understanding of the invention, reference is made to the following detailed description taken in connection with the accompanying drawings, in which.

DETAILED DESCRIPTION

Figure 1:
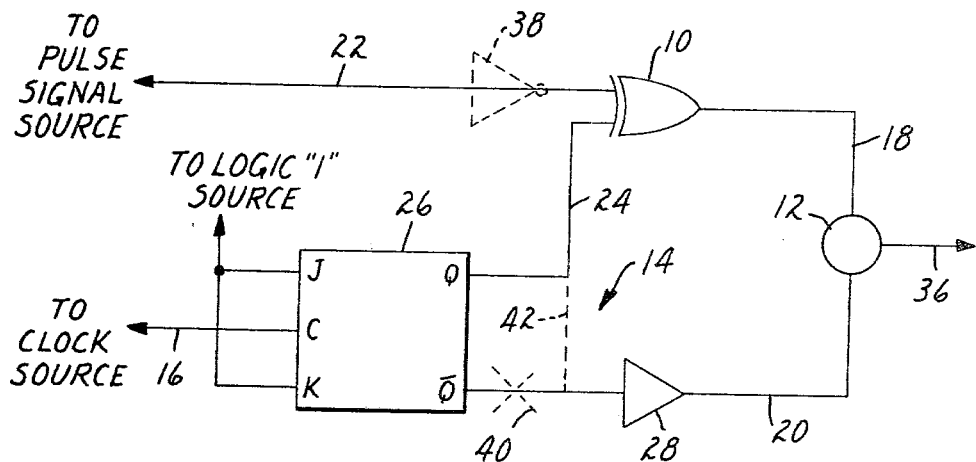
FIG. 1 is a schematic for a circuit embodying the invention for use at a signal transmitting facility.

A clock signal at a given frequency is used in the generation of input pulse signals at a transmission facility. This clock signal must be available at the facility receiving the transmitted signals so they can be processed. Referring to FIG. 1 a schematic is shown of circuitry embodying this invention for use at a transmission facility which enables clock signal information to be used to modify the amplitude of the pulse signals in a manner such that the clock information can be recovered at the receiving facility to generate the clock signal for reconstructing the pulse signals and processing them. The circuitry includes an exclusive-or logic gate 10, an adder circuit 12 and a circuit means 14. The circuit means 14 receives the clock signal via a conductor 16 and serves to provide a series of alternate "1" and "0" logic signals at a frequency that is one-half the frequency of the clock signal plus a second series of logic signals which are the inverse of the first series of logic signals with the transitions in such logic signals being coincident with the input pulse signal transitions. The adder circuit 12 has two inputs. One input is connected to receive the output of the exclusive-or gate 10 via a conductor 18 with the other input connected to receive the first series of logic signals from the circuit means 14 via a conductor 20. Assuming the amplitude of the signals that the adder circuit 12 receives from the exclusive-or gate 10 is D, which can be any level greater than a level R, the circuit means 14 is arranged to provide its first series of logic signals to the adder circuit 12 at an amplitude K, where K is equal to or greater than D. The input pulse signals are applied via the conductor 22 to one input of the gate 10 while a conductor 24 connects the other input of gate 10 to the circuit means 14 to receive the second series of alternate "1" and "0" logic signals.

The functions of the circuit means 14 are provided by a J-K type flip-flop 26 and an amplifier 28. The C input of the flip-flop receives the clock signal via the conductor 16 and its Q output is connected to the exclusive-or gate 10 via the conductor 24. The $\overline{Q}$ output, which is the inverse of the Q output, is connected to the input of amplifier 28 which has its output connected to the adder circuit 12. The J and K inputs of the flip-flop are connected to receive a continuous logic "1" signal from a logic "1" source (not shown).

As indicated, the invention requires that the amplitude of the logic signals applied via the conductor 20 to the adder circuit 12 be equal to K where K is equal to or greater than D. With these conditions, the circuitry of FIG. 1 will operate to cause an output of pulse signals to be provided from the adder circuit 12 wherein the amplitude of a given pulse is different than the preceding pulse. Further, the possible amplitudes of the output signal are R, D, K and D+K.

Figure 2:
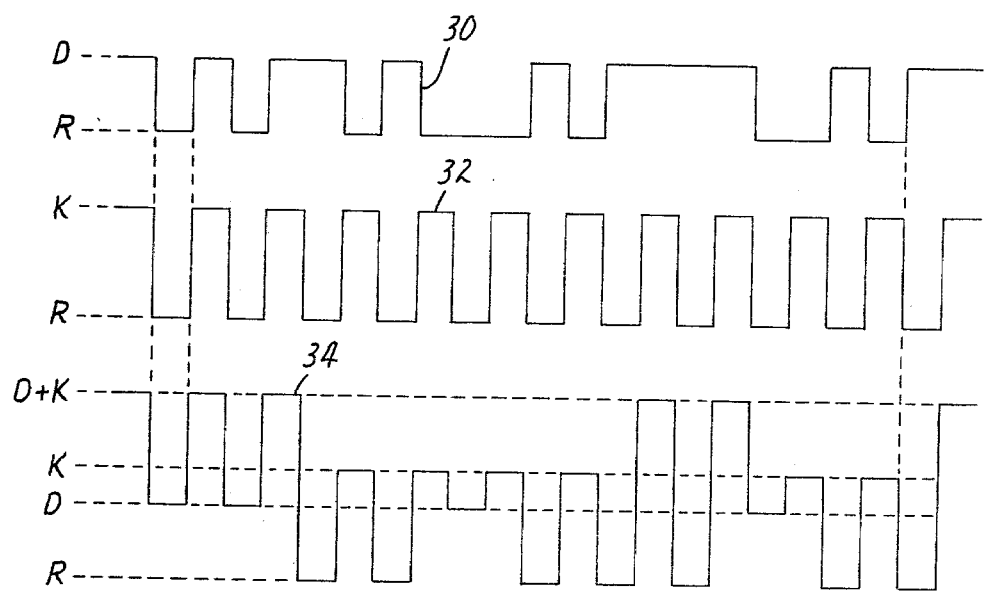
FIG. 2 is a showing of signal forms representative of signals provided at various points in the circuit of FIG. 1.

Referring to FIG. 2, representative signals present at various points in the circuitry are shown. The signal at 30 is representative of pulse signals presented to the exclusive-or gate 10, while the signal at 32 represents the first series of "1" and "0" logic signals presented to the adder circuit 12 based on the output from the $\overline{Q}$ output of the flip-flop 26. The signal representation indicated at 34 is the composite signal presented at the output 36 of the adder circuit 12 in response to the signals applied to the adder circuit when signals 30 and 32 are presented in the circuitry of FIG. 1.

Since the exclusive-or gate 10 operates to provide a logic output of A$\overline{B}$ or B$\overline{A}$ when the inputs to the gate are A and B, the composite signal 34 provided by adding the two inputs to the adder circuit 12 can be determined from the signal representations at 30 and 32, if it is assumed the amplitude of the signal from the output of the exclusive-or is per the amplitude shown for the signal at 30. When the signal 32 is "high", the composite signal is the signal representation at 30 plus the signal representation at 32. When the signal 32 is "low", the composite signal is the inverse of the signal representation at 30 plus the signal representation at 32.

The composite signal 34 presented at the output 36 of the adder circuit which would be sent to a receiving facility has a change in amplitude presented on a regular basis at one-half the frequency of the clock signal to provide clock information at the receiving facility which can be used to regenerate the clock signal for use in reconstructing the input pulse signals and processing them after they are reconstructed from the composite signal 34 at the receiving facility.

Figure 3:
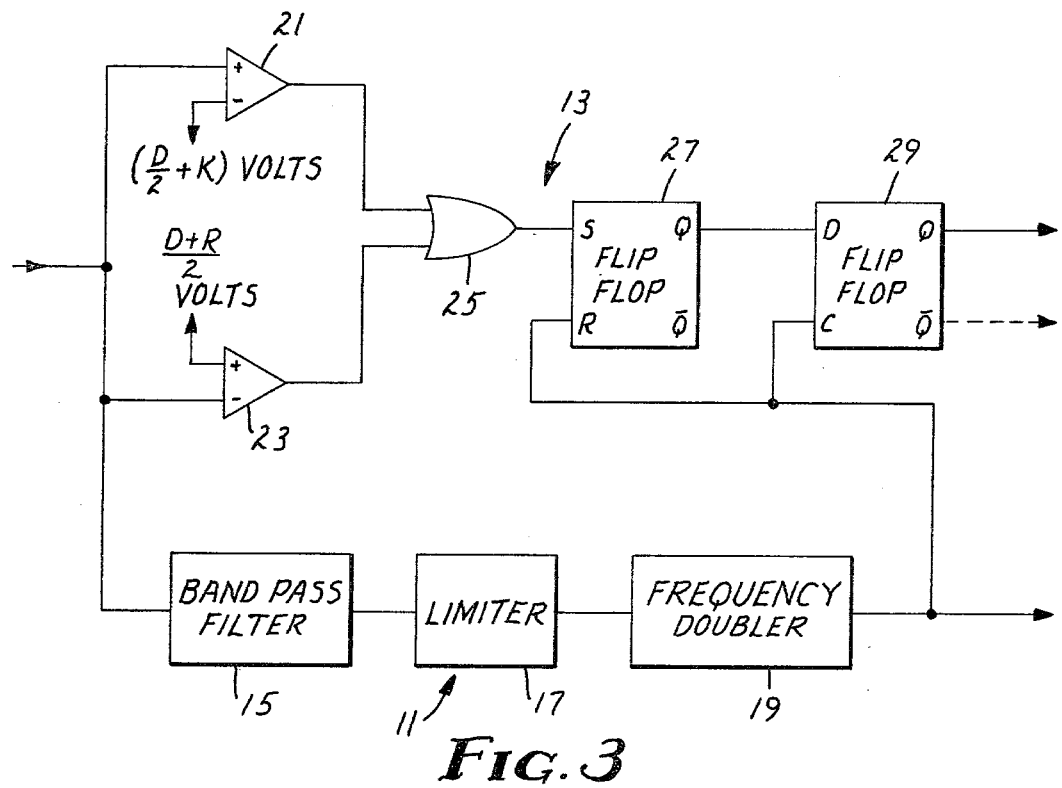
FIG. 3 is a schematic for a circuit embodying the invention for use at a signal receiving facility.

The circuitry shown at FIG. 3 provides a means whereby the signal provided by the circuitry of FIG. 1 can be used to obtain the clock signal and to reconstruct the pulse signals provided to the circuitry of FIG. 1. The circuitry includes a first circuit portion 11 for regenerating the clock signal from the signal provided from the circuitry of FIG. 1 and a second circuit portion 13 which recovers the pulse signals provided to the circuitry of FIG. 1 by utilizing the signal provided from the circuitry of FIG. 1 plus the clock signal produced by the first circuit portion 11.

The first circuit portion 11 includes a bandpass filter 15 which receives the signal produced by the circuitry of FIG. 1, a slicer or clipper-limiter 17 connected to limit the amplitude of the output from the bandpass filter and a frequency multiplier 19 for doubling the frequency of the output received from the slicer 17. The output of the frequency multiplier is the clock signal, which is then available for reconstructing the pulse signals by the second circuit portion 13 and for processing the reconstructed pulse signals.

The second circuit portion 13 includes first and second comparators 21 and 23, respectively, each receiving the output signal produced by the circuit of FIG. 1. An OR circuit 25 serves to apply a logic "1" signal appearing at the output either of the comparator to a timing circuit provided by an R-S type flip-flop 27 and a D-type flip-flop 29. The output of the OR circuit 25 is applied to the set input of the flip-flop 27. The Q output of flip-flop 27 is connected to the D input of the flip-flop 29. The output of the second circuit portion appears at the Q output of flip-flop 29. The output of the frequency multiplier 19, at which the clock signal appears, is connected to the reset input of flip-flop 27 and the clock input of flip-flop 29 so operation of the timing circuit will be timed by the clock signal.

It should be noted that the signal provided by the circuit of FIG. 1 is applied to the positive input of comparator 21 and to the negative input of comparator 23. The negative input of comparator 21 is biased at a voltage that is in excess of K and less than D+K. The positive input of comparator 23 is biased at a voltage that is less than D. Referring to representative signal that is received, which is indicated at 34 at FIG. 2, it can be seen that comparator 21 presents a logic "1" at its output when the received signal is in excess of the bias supplied to comparator 21, while comparator 22 presents a logic "1" at its output when the received signal is below the bias supplied to comparator 22. It is preferred that the bias voltage for comparator 21 be set at the midpoint between K and D+K or at K+D/2 with the bias voltage for comparator 22 set at the midpoint between D and R or (D+R)/2 for reliable operation of the circuit since such bias voltages will eliminate the variations that can be expected from the nominal amplitude levels of D and K which are presented in a signal supplied to the comparators. Referring to the signal 34 of FIG. 2, which is representative of the input signal to the circuit of FIG. 3, it can be seen that each time the signal 34 is greater than K+D/2, a logic "1" will be presented to the OR gate 25 and that a logic "1" will also be presented to the OR gate each time the signal 34 is less than (D+R)/2 and greater than R. Such logic "1" signals are moved through the timing circuit provided by the flip-flops 27 and 29, as will be explained, to present the pulse signals as shown at 30 in FIG. 2.

Referring to the timing portion 13 of the circuit of FIG. 3, when logic "1" is presented at the set input of flip-flop 27 between clock transitions, the Q output presents a logic "1" which is applied to the "D" input of the flip-flop 29. This logic "1" appears at the Q output of flip-flop 29 upon occurrence of the next positive clock going transition and flip-flop 27 is reset causing the Q output to present a logic "0". Accordingly, the transitions in the output of the timing circuit will occur at the same time as transitions in the clock signal.

It can be appreciated that while a plurality of pulse signal channels which are timed by a clock signal may be provided at a transmission facility, only one channel of pulse signals need be supplied to the circuit of FIG. 1 with the resulting amplitude modified pulse signal being sent a receiving facility where it is applied to the circuit of FIG. 3 to cause the clock signal to be produced for use in processing the pulse signals recovered by the circuit of FIG. 3 as well as the other pulse signals that are sent from the transmission facility to the receiving facility.

It can be appreciated that modifications can be made to the circuitry of FIG. 1 so the output from the adder circuit 12 remains in a form wherein the "1's" of the pulse signals 34 are represented by an amplitude greater than K or less than D with "0's" represented by an amplitude less than K and greater than D. Referring to FIG. 1, it is possible, for example, to invert the pulse signals 34 before they are applied to the exclusive-or gate 10 by the use of an inverter 38 indicated by the dotted lines. When inverter 38 is used the amplifier 28 and the exclusive-or gate 10 can be connected to the same output of the flip-flop 26. This is shown in FIG. 1 wherein the connection made to the $\overline{Q}$ output of the flip-flop 26 is eliminated as indicated by the dotted line "X" at 40 with the amplifier 28 receiving the alternate "1" and "0" logic signals from the Q output of flip-flop 26 via the connection indicated by the dotted line at 42. $\overline{Q}$ could, of course, also be used as the common output of the flip-flop for gate 10 and the amplifier 28.

It is also possible to modify the circuitry of FIG. 1, as indicated above, but without using the inverter 38. The output signal from the adder 36 is then in a form wherein the "0's" of the pulse signals 34 applied to exclusive-or gate 10 are represented in transmitted signal when it has an amplitude greater than K or less than D with "1's" of the pulse signals 34 applied to exclusive-or gate 10 represented in the transmitted signal when it has an amplitude greater than D and less than K.

What is claimed is:

1. Circuitry for receiving a clock signal and pulse signals produced in timed relationship with the clock signal and at a frequency that is one-half the frequency of the clock signal to produce a signal for transmission via a transmission channel including:
   a circuit portion adapted to receive the clock signals for providing a series of alternate "1" logic and "0" logic signals at a frequency equal to one-half the frequency of the clock signal;
   an exclusive-or logic means having two inputs and an output, said logic means adapted for receiving the pulse signals at one of said two inputs and receiving said series of logic signals from said circuit portion at the second of said two inputs; and
   an adder circuit adapted to receive said series of logic signals and the output of said exclusive-or logic means with the amplitude of said series of logic signals equal to or greater than the amplitude of the output of said exclusive-or logic means for providing an output that is a succession of signals, at one-half the frequency of the clock signal, each signal of said succession of signals having an amplitude that is one of four possible amplitudes and different than the amplitude of the preceding signal of said succession of signals.

2. Circuitry in accordance with claim 1 wherein said logic means is adapted for receiving the inverse of the pulse signals at said one of said two inputs.

3. Circuitry in accordance with claim 1 wherein the logic of said series of logic signals received at said second of said two inputs is the inverse of the logic of said series of logic signals received at said adder circuit.

4. Circuitry in accordance with claim 1 wherein said circuit portion includes a flip-flop circuit having two outputs at which said series of logic signals are presented and an amplifier connected between one of said outputs and said adder circuit.

5. Circuitry in accordance with claim 4 wherein said second of said inputs of said exclusive-or logic means is connected to the same one of said outputs of said flip-flop as said amplifier is connected.

6. Circuitry in accordance with claim 4 wherein said second of said input of said exclusive-or logic means is connected to the other output of said two outputs of said flip-flop.

7. Circuitry for providing unmodified pulse signals in response to amplitude modified pulse signals which change amplitude at one-half the frequency of a clock signal wherein the possible amplitudes are R, D, K or D+K where D is any amplitude greater than amplitude R and K is equal to or greater than D including
   a first circuit portion for receiving the amplitude modified pulse signals and having an output at which an output signal having a frequency equal to the clock signal is provided;
   a second circuit portion adapted for receiving the modified pulse signals and said output signal of said circuit portion for providing an output when the modified pulse signals presents an amplitude in excess of K and when the modified pulse signals present an amplitude less than D whereby an output of unmodified pulse signals is provided in timed relationship with the output signal of said first circuit portion.

8. Circuitry in accordance with claim 7 wherein said second circuit portion includes
   a first comparator adapted for receiving the modified pulse signal for providing an output when the modified pulse signal presents an amplitude in excess of K;
   a second comparator adapted for receiving the modified pulse code modulated signal for providing an output when the modified pulse code moduled signal presents an amplitude less than D;
   and means connected to said first and second comparators and to said output of said first circuit portion for combining the output of said first comparator and said second comparator to provide an output at which unmodified pulse signals are provided in timed relationship with said output signal of said first circuit portion.

9. Circuitry in accordance with claim 8 wherein said means includes two series connected flip-flop circuits, each connected for operation under the control of said output signal of said first circuit portion.

10. Circuitry in accordance with claim 9 wherein one of said flip-flop circuits has two outputs at which said output of unmodified pulse signals are provided.

11. Circuitry in accordance with claim 7 wherein said first circuit portion includes a bandpass filter for receiving the amplitude modulated signals, a limiter circuit connected for receiving the output of said bandpass filter for limiting the output of said bandpass filter and a frequency doubler connected for receiving the output of said limiting circuit and in response thereto providing said output signal of said first circuit portion.

12. Circuitry in accordance with claim 11 wherein said second circuit portion includes
  a first comparator adapted for receiving the modified pulse signal for providing an output when the modified pulse signal presents an amplitude in excess of K;
  a second comparator adapted for receiving the modified pulse code modulated signal for providing an output when the modified pulse code moduled signal presents an amplitude less than D;
  and means connected to said first and second comparators and to said output of said first circuit portion for combining the output of said first comparator and said second comparator to provide an output at which unmodified pulse signals are provided in timed relationship with said output signal of said first circuit portion.

13. Circuitry in accordance with claim 12 wherein said means includes two series connected flip-flop circuits, each connected for operation under the control of said output signal of said first circuit portion.

14. Circuitry in accordance with claim 13 wherein one of said flip-flop circuits has two outputs at which said output of unmodified pulse signals are provided.

* * * * *